United States Patent
Iwata et al.

(10) Patent No.: US 9,385,937 B2
(45) Date of Patent: Jul. 5, 2016

(54) DYNAMIC ROUTE BRANCHING SYSTEM AND DYNAMIC ROUTE BRANCHING METHOD

(71) Applicant: NEC CORPORATION, Tokyo (JP)

(72) Inventors: Atsushi Iwata, Tokyo (JP); Akio Iijima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/566,137

(22) Filed: Dec. 10, 2014

(65) Prior Publication Data

US 2015/0092570 A1    Apr. 2, 2015

Related U.S. Application Data

(63) Continuation of application No. 13/510,622, filed as application No. PCT/JP2010/070208 on Nov. 12, 2010, now Pat. No. 9,001,656.

(30) Foreign Application Priority Data

Nov. 18, 2009  (JP) ................................. 2009-263342

(51) Int. Cl.
| | |
|---|---|
| H04L 12/28 | (2006.01) |
| H04L 12/701 | (2013.01) |
| H04L 12/707 | (2013.01) |
| H04L 12/26 | (2006.01) |

(52) U.S. Cl.
CPC ................ *H04L 45/00* (2013.01); *H04L 43/10* (2013.01); *H04L 45/24* (2013.01)

(58) Field of Classification Search
None
See application file for complete search history.

(56) References Cited

U.S. PATENT DOCUMENTS

| | | |
|---|---|---|
| 6,310,881 B1 | 10/2001 | Zikan et al. |
| 6,735,190 B1 | 5/2004 | Chuah et al. |
| 6,865,151 B1 | 3/2005 | Saunders |
| 2002/0080888 A1 | 6/2002 | Shu et al. |
| 2002/0150041 A1* | 10/2002 | Reinshmidt ......... H04L 12/2697 370/216 |
| 2003/0133443 A1 | 7/2003 | Klinker et al. |
| 2005/0286487 A1 | 12/2005 | Chitrapu |
| 2006/0291392 A1 | 12/2006 | Alicherry et al. |
| 2007/0094147 A1 | 4/2007 | Fukui et al. |
| 2007/0110035 A1 | 5/2007 | Bennett |

(Continued)

FOREIGN PATENT DOCUMENTS

| | | |
|---|---|---|
| EP | 2 107 731 A1 | 10/2009 |
| JP | 10-075248 A | 3/1998 |

(Continued)

OTHER PUBLICATIONS

International Search Report in PCT/JP2010/070208 dated Dec. 14, 2010 (English Translation Thereof).

(Continued)

*Primary Examiner* — Otis L Thompson, Jr.
(74) *Attorney, Agent, or Firm* — McGinn IP Law Group PLLC

(57) ABSTRACT

A system that includes a plurality of nodes to forward a data packet in a network, includes a controller to select at least a node dividing a data path of the data packet into a first path and a second path, from the nodes, based on a condition of the data path, and a node selected by the controller being capable of forwarding the packet to the first path and the second path according to an instruction from the controller. The second path includes a bypass path of the first path.

17 Claims, 12 Drawing Sheets

(56) References Cited

U.S. PATENT DOCUMENTS

| | | |
|---|---|---|
| 2007/0118636 A1* | 5/2007 | Yang et al. .................. 709/223 |
| 2007/0177594 A1 | 8/2007 | Kompella |
| 2007/0223377 A1 | 9/2007 | de Heer |
| 2008/0320254 A1 | 12/2008 | Wingard et al. |
| 2009/0245204 A1 | 10/2009 | Voyer et al. |
| 2009/0253433 A1 | 10/2009 | Voyer et al. |
| 2009/0265413 A1 | 10/2009 | Katsuragi et al. |
| 2011/0110309 A1 | 5/2011 | Bennett |
| 2011/0283016 A1 | 11/2011 | Uchida |
| 2011/0317559 A1 | 12/2011 | Kern et al. |
| 2012/0307794 A1 | 12/2012 | Shaheen et al. |
| 2013/0201841 A1 | 8/2013 | Zhang et al. |
| 2013/0215772 A1 | 8/2013 | Kaur et al. |
| 2014/0140374 A1* | 5/2014 | Menzel et al. ................ 375/141 |

FOREIGN PATENT DOCUMENTS

| | | |
|---|---|---|
| JP | 2004-312153 A | 11/2004 |
| JP | 2007-094681 A | 4/2007 |
| JP | 2007-208953 A | 8/2007 |
| JP | 2009-177739 A | 8/2009 |
| WO | WO 2005/062636 A1 | 7/2005 |

OTHER PUBLICATIONS

"OpenFlow The switch Specification Version 1.0.0 (Wire Protocol 0x01) Dec. 31, 2009" <http://www.openflowthe_switch.org/documents/openflow-spec-v1.0.0pdf>.

European Search Report dated Apr. 24, 2013.

"OpenFlow Switch Consortium", Internet <URL:http://www.openflowswitch.org>.

U.S. Office Action dated Aug. 21, 2014 in U.S. Appl. No. 13/510,622.

U.S. Office Action dated Feb. 10, 2014 in U.S. Appl. No. 13/510,622.

U.S. Notice of Allowance dated Dec. 5, 2014 in U.S. Appl. No. 13/510,622.

* cited by examiner

Fig. 11

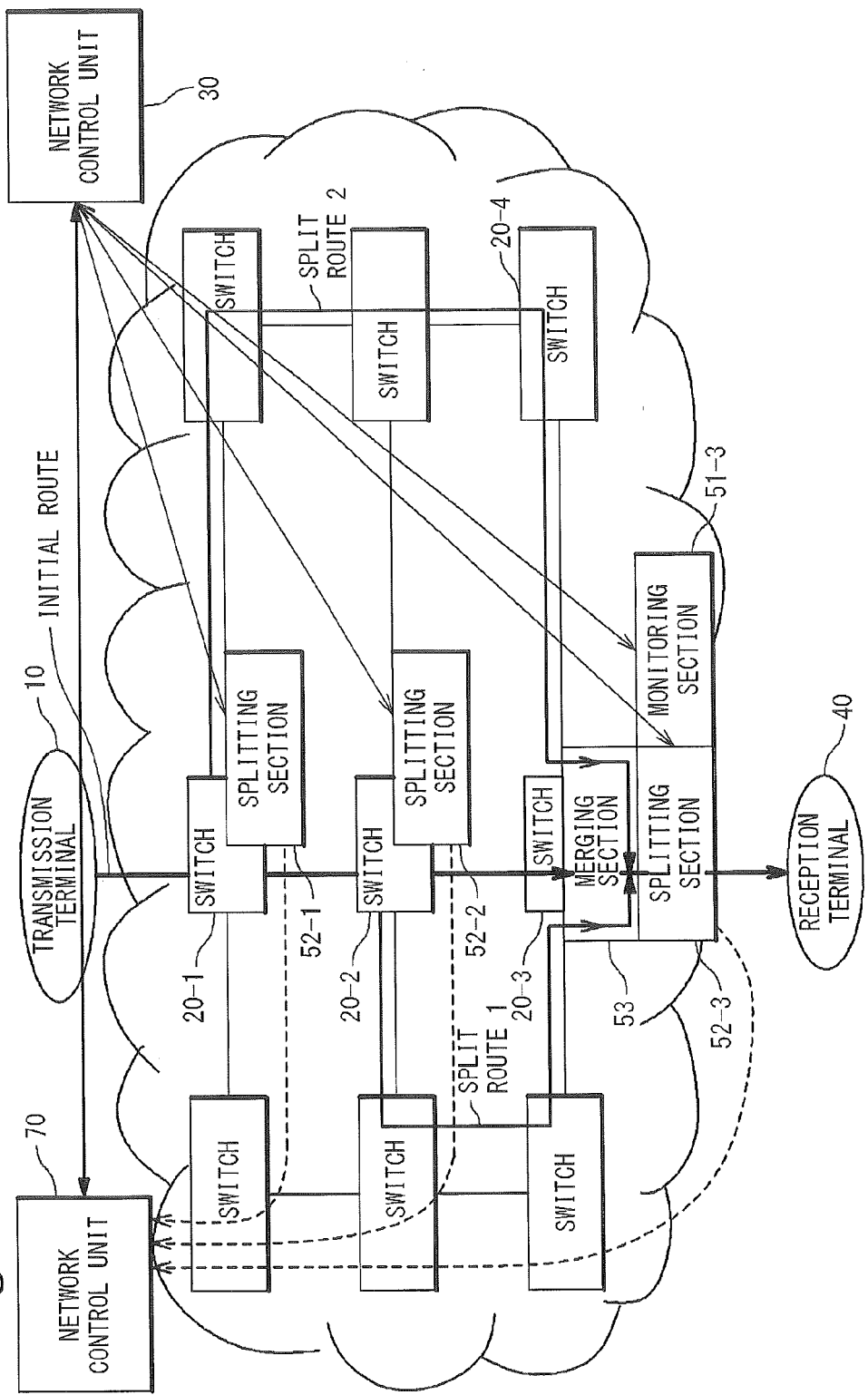

DYNAMIC ROUTE BRANCHING SYSTEM AND DYNAMIC ROUTE BRANCHING METHOD

The present application is a Continuation application of U.S. patent application Ser. No. 13/510,622, filed on May 17, 2012, which is based on International Application No. PCT/JP2010/070208, filed on Nov. 12, 2010, which is based on and claims priority from Japanese patent application No. 2009-263342, filed on Nov. 18, 2009, the entire contents of which are incorporated herein by reference.

TECHNICAL FIELD

The present invention is related to a dynamic route branching system, and especially, to a dynamic route branching system in a network which adopts a multipath route communication.

BACKGROUND ART

Conventionally, there were the following problems (1)-(3) in case of multipath route communication to improve the communication when the traffic is discarded in a network due to an insufficient link band width on a route in the network.

(1) It was difficult to dynamically adopt a multipath route according to the reception situation of the traffic of each terminal.

(2) When adopting the multipath route, it was difficult to select an identical copy (full mirroring) and a partial copy (partial mirroring), a flow base division, a random division and so on in a split position according to the situation of the network.

(3) It was difficult to adopt the dynamic optimum design so as to minimize the cost imposed on the network by taking a multipath route.

Regarding the problem (1), as a generally used multipath route generation technique, there are "OSPF ECMP technique" (Open Shortest Path First Equal Cost Multi Path), "MPLS Traffic Engineering technique" (Multi Protocol Label Switching Traffic Engineering) and so on.

In "the OSPF ECMP technique", because a multipath route is statically generated according to network topology and a link cost in the network, a plurality of routes are generated in a portion of the multipath route of the identical cost in the network. However, it is difficult to set a plurality of routes in an optional position, and the route is selected in a flow base by the Hash function in the split position of the multipath. Therefore, it is difficult to control according to the reception situation of the traffic of each terminal.

On the other hand, in "MPLS Traffic Engineering technique", a multipath route is dynamically generated according to the network topology, the link cost, and a traffic amount flowing through the link. However, the multipath can not be generated from a node on the way of the network and it is difficult to control according to the reception situation of the traffic of each terminal.

Therefore, it is demanded that multipath route is dynamically generated according to the reception situation of the traffic flow of each terminal to improve the traffic reception performance of the terminal.

Regarding the problem (2), a plurality of routes are prepared previously at the edge of the network, as shown in JP 2004-312153A (Patent Literature 1), and JP 2007-94681 A (Patent Literature 2). It should be noted that the edge of the network is an entrance of the network.

In JP 2004-312153 A (Patent Literature 1), a method is disclosed in which in the environment that optical edges are connected to both of an IP network (Internet Protocol Network) and a photonic network, two routes are set previously, and communication is switched to the side of the photonic network when the a predetermined quantity of traffic flows through the IP network. In this method, communication is switched to the photonic network when detecting a large amount of traffic, because enough performance can not be attained in a large capacity communication of the IP network. In this way, because this method carries out a simple switching control between the networks, a function of branching in an optional position in the network and copy and division functions such as the identical copy, the partial copy, the flow base division and the random division can not be attained.

On the other hand, in JP 2007-94681A (Patent Literature 2), a method is disclosed in which a redundant route candidacy (a route which is not allocated with a resource) is provided previously when a plurality of routes in the network are provided, and a resource is allocated once more at a necessary time. In this method, the redundant path is not allocated with a resource previously, and a plurality of transmission servers shares a route. In this way, because this method is related to a resource sharing method of a redundant path, a function of branching in an optional position of the network and the functions such as the identical copy, the partial copy, the flow base division and the random division can not be attained.

Moreover, in the problem (2), as shown in JP 2007-208953A (Patent Literature 3), a technique is known in which a plurality of multicast paths are dynamically set in the edge of the network (entrance of the network). In JP 2007-208953A (Patent Literature 3), a method of generating a plurality of multicast trees is disclosed. This method uses a hash function in use after the generation. However, a destination for the traffic to be transferred to according to the contents and a route branched from a transmission source (edge) of the multicast are determined by use of the hash function that regarding the route of the multicast. In this way, because this method is to make the multicast tree itself redundant, there is no function of branching in an optional position in the network and of a copy and division such as an identical copy, a partial copy, a flow base division and a random division.

Therefore, when adopting the multipath route, a technique is demanded in which either of the identical copy, the partial copy, the flow base division, the random division and so on is dynamically selected in the split position according to the situation of the network, so as to improve in the traffic reception performance of the terminal.

Regarding the problem (3), because a load is imposed on the network due to the traffic subjected to the multicast communication when the multicast communication is branched from an optional route, it is required to maximize the reception performance of the terminal while suppressing the load as much as possible. However, as mentioned above, because there is not a function of branching in the optional position in the network in a conventional method, there is no technique for maximizing reception performance of the terminal.

CITATION LIST

[Patent Literature 1] JP 2004-312153A
[Patent Literature 2] JP 2007-94681A
[Patent Literature 3] JP 2007-208953A

[Non-Patent Literature 1]
"The OpenFlow The switch Consortium" <http://www.openflowthe switch.org/>

[Non-Patent Literature 2]
"OpenFlow The switch Specification Version 1.0.0 (Wire Protocol 0x01) Dec. 31, 2009"<http://www.openflowthe switch.org/documents/openflow-spec-v1.0.0.pdf>

SUMMARY OF THE INVENTION

In the present invention, a branching method such as a copy and a division, and a split route are calculated, and the traffic flow is dynamically branched to a plurality of routes by the branching method such as the copy and the division in positions of one or more optional nodes of the nodes through which the communication traffic passes, to restore the traffic on the reception side, in order to attempt optimization based on the maximization and stabilization of the reception quality by monitoring the reception quality of communication traffic flow on a network, a split position of the traffic.

A dynamic route branch system of the present invention is provided with a managing unit and a dynamic route branching unit. The control unit monitors reception quality of a traffic on a network and carries out dynamic route setting to an optional node in the network. The dynamic route branching unit is possibly arranged in a reception terminal as a destination of the traffic. The dynamic route branching unit is provided in the node and includes at least one of: a monitoring section configured to monitor the traffic flow having reached the node when being provided in the node in the network, and to notify the monitoring result to the control unit; a splitting section configured to split the traffic flow received from a node at a previous stage to the node into split traffic flows which are transmitted onto an initial route and a split route in response to an instruction from the control unit, when being provided in the node relaying the traffic flow in the network; and a merging section configured to merge the split traffic flows having reached through the initial route and the split route to restore the traffic flow when being provided in a node at a subsequent stage to the node. It should be noted that network the network may be a wire network or a wireless network. As an example of a node on the network, a switch is assumed. Here, the monitoring section and the merging section may exist on the reception terminal and the managing unit.

A dynamic route branching unit of the present invention which is possibly provided in a node relaying a traffic flow on a network and a reception terminal as a destination of the traffic flow, includes: a monitoring section configured to monitor the traffic flow having reached the node when being provided in the node in the network, and to notify the monitoring result to the control unit; a splitting section configured to split the traffic flow received from a node at a previous stage to the node into split traffic flows which are transmitted onto an initial route and a split route in response to an instruction from the control unit, when being provided in the node relaying the traffic flow in the network; and a merging section configured to merge the split traffic flows having reached through the initial route and the split route to restore the traffic flow when being provided in a node at a subsequent stage to the node.

In a dynamic route branching method, a control unit monitors reception quality of a traffic flow on a network to carry out dynamic route setting to an optional node on the network. Also, it monitors a traffic flow having reached a predetermined node on the network to notify a monitoring result to the control unit. A node splits and transmits the traffic flow received from a split node at a previous stage to a node relaying the traffic flow on the network onto an initial route and a split route in response to an instruction from the control unit. A node of a subsequent stage to the splitting node merges the traffic flows having reached through the initial route and the split route to restore the traffic flow in a node at a subsequent stage to the split node.

A program of the present invention is executed by a computer corresponding to at least one out of the node which relays traffic on the network and the reception terminal which is the address of the traffic. The computer which executes this program is possible to monitor traffic and to notify the monitoring result to the managing unit which carries out a dynamic route setting to an optional node on the network. Also, it is possible to branch and transmit the traffic to an initial route and a split route in response to an instruction from the managing unit. Also, it is possible to merge the traffics having reached through the initial route and the split route to restore. It should be noted that the program of the present invention can be stored in the storage and the storage medium.

Even if a phenomenon that a traffic flow is discarded in a main route due to the change of state in the network occurs, the whole traffic is quickly restored by using the traffic on the sub-route, so as to improve the traffic reception performance of the reception terminal.

BRIEF DESCRIPTION OF THE DRAWINGS

FIG. 11 is a diagram showing an eighth exemplary embodiment of the present invention; and FIG. 12 is a diagram showing a ninth exemplary embodiment of the present invention.

DESCRIPTION OF EXEMPLARY EMBODIMENTS

Basic Configuration

Hereinafter, the basic configuration of the present invention will be described with reference to the attached drawings.

Figure 1:
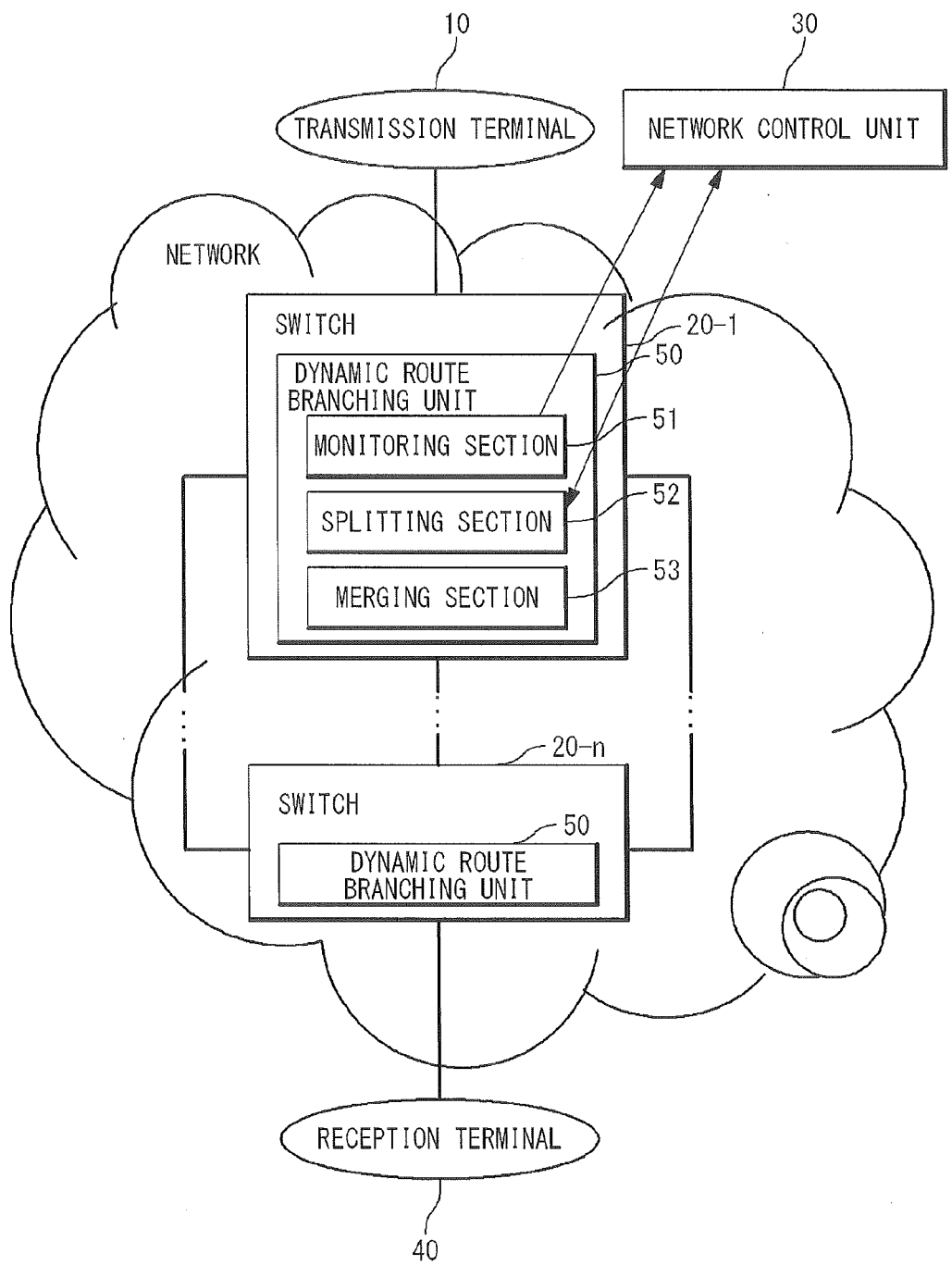
FIG. 1 is a schematic diagram showing a basic configuration example of a dynamic route branching system of the present invention.

As shown in FIG. 1, the dynamic route branching system of the present invention is provided with a transmission terminal 10, switches 20 (20-$i$, $i=1$ to n: n is the number of switches), a network control unit 30 and a reception terminal 40.

The transmission terminal 10 transmits packets of character data, speech data, video data and so on to the reception terminal 40 through any of the switches 20 (20-$i$, $i=1$ to n) corresponding to nodes on the network. A data amount of the packets transmitted on the network is called a traffic (flow).

The network control unit 30 is a management unit which monitors the reception quality of the traffic (flow) on the network and carries out a dynamic route setting to the switches 20 (20-$i$, i=1 to n). In this case, the network control unit 30 is communicable with each of the switches 20 (20-$i$, i=1 to n), and manages topology data (network topology), the band width data of a network link and so on of the whole network, and carries out the optimum design of a branch or split position (a switch at a split start point) and a branch or split route.

Each of the switches 20 (20-$i$, i=1 to n) is provided with a dynamic route branching unit 50. That is, the dynamic route branching units 50 of the same number as the switches 20 exist. It should be noted that actually, the dynamic route branching unit 50 may be the switches 20 itself.

The dynamic route branching unit 50 is provided with a monitoring section 51, a splitting section 52 and a merging section 53. Therefore, each of the switches 20 (20-$i$, i=1 to n) is provided with the monitoring section 51, the splitting section 52 and the merging section 53. However, each of the switches 20 (20-$i$, i=1 to n) is not necessary to contain all of the monitoring section 51, the splitting section 52 and the merging section 53, and is sufficient to contain any of the monitoring section 51, the splitting section 52 and the merging section 53 to be used at least.

The monitoring section 51 monitors received packets and notifies the monitoring result to the network control unit 30.

The splitting section 52 transmits the received packet on a route selected by the network control unit 30. At this time, the splitting section 52 splits the received packets, if necessary, and distributes and transmits each of the branched packets onto the route selected by the network control unit 30.

The merging section 53 merges split traffics to restore an appropriate traffic. At this time, if the received packet is the split packet, the merging section 53 outputs a packet flow obtained by merging split packet, and if the received packet is not the split packet, the merging section 53 outputs it just as it is.

The network control unit 30 attempts minimization of resources used in a route to a destination of the multipath and maximization/stabilization of reception quality in the destination based on a split position selection algorithm. Specifically, the network control unit 30 selects a route in which a total of the resource use amounts over the whole route is minimum or a route in which the stability of the network is high, of the routes in which performance is maximized after merging the split packets. As an example of the resource use amount, calculation result of "Hop number×band width", a calculation result of "distance×band width" and so on are exemplified. However, actually, it is not limited to these examples. It should be noted that Hop number is the number of switches through which the packet passes from the transmission terminal 10 to the reception terminal 40.

(Example of Hardware)

It should be noted that as an example of the transmission terminal 10 and the reception terminal 40, a PC (personal computer) and a mobile phone are exemplified. In addition, as an example of the transmission terminal 10 and the reception terminal 40, a thin client terminal, a work station, a mainframe, a supercomputer, a car navigation system, a carrying game machine, a home game machine, a gadget (electronic equipment), an interactive TV, a digital tuner, a digital recorder, an information home appliance, a POS (Point of Sale) terminal, an OA (Office Automation) equipment, and so on are exemplified. Also, as an example of the network control unit 30, a computer such as a PC, a thin client server, a work station, a mainframe, and a supercomputer are exemplified. The transmission terminal 10, the network control unit 30, and the reception terminal 40 may be mounted on mobile bodies such as a vehicle, a ship, and an aircraft.

Also, as an example of the switches 20 (20-$i$, i=1 to n), a layer 2 switch which relays data on a data link layer (the second layer), a layer 3 switch which relays data on a network layer (the third layer), a layer 4 switch which relays data on a transport layer (the fourth layer), a layer 7 switch (an application switch) which relays data on an application layer (the seventh layer), a multi-layer switch (multi-layer switch) and so on are exemplified. The multi-layer switch is classified in detail every layer of the OSI Reference Model. Besides, as an example of the switches 20 (20-$i$, i=1 to n), a proxy server, a gateway, a firewall, a load balancer (a load distribution apparatus), a computer and a relay equipment which are equivalent to them and so on are exemplified.

Moreover, as an example of the network on which the switches 20 (20-$i$, i=1 to n) exist, the Internet, a LAN (Local Area Network), a wireless LAN, a WAN (Wide Area Network), a backbone, a community antenna television system (CATV) line, a fixation telephone network, a mobile phone network, a WiMAX (IEEE 802.16a), 3G (3rd Generation), a lease line, IrDA (Infrared Data Association), Bluetooth (registered trademark), a serial communication line, a data bus and so on are exemplified.

Each of the monitoring section 51, each of the splitting section 52 and the merging section 53 is realized by an electronic circuit corresponding to the function. Or, each of the monitoring section 51, the splitting section 52 and the merging section 53 may be realized by a hardware configuration such as a processor driven based on a program, a software configuration such as a program to drive the hardware configuration so as to perform desired processing, and a storage unit which stores the software and data of various kinds.

As an example of the above-mentioned processor, a CPU (Central Processing Unit), a microprocessor, a microcontroller, a semiconductor integrated circuit (IC) which has a similar function and so on are exemplified. However, actually, it is not limited to these examples.

Also, as an example of the above-mentioned storage unit, semiconductor memory devices such as RAM (Random Access Memory), ROM (Read Only Memory), EEPROM (Electrically Erasable and Programmable Read Only Memory) and a flash memory, secondary storage units such as a HDD (Hard Disk Drive) and an SSD (Solid State Drive), storage media such as DVD (Digital Versatile Disk) and a memory card are exemplified.

However, actually, it is not limited to these examples.

First Exemplary Embodiment

Next, the first exemplary embodiment of the present invention will be described.

Figure 2:
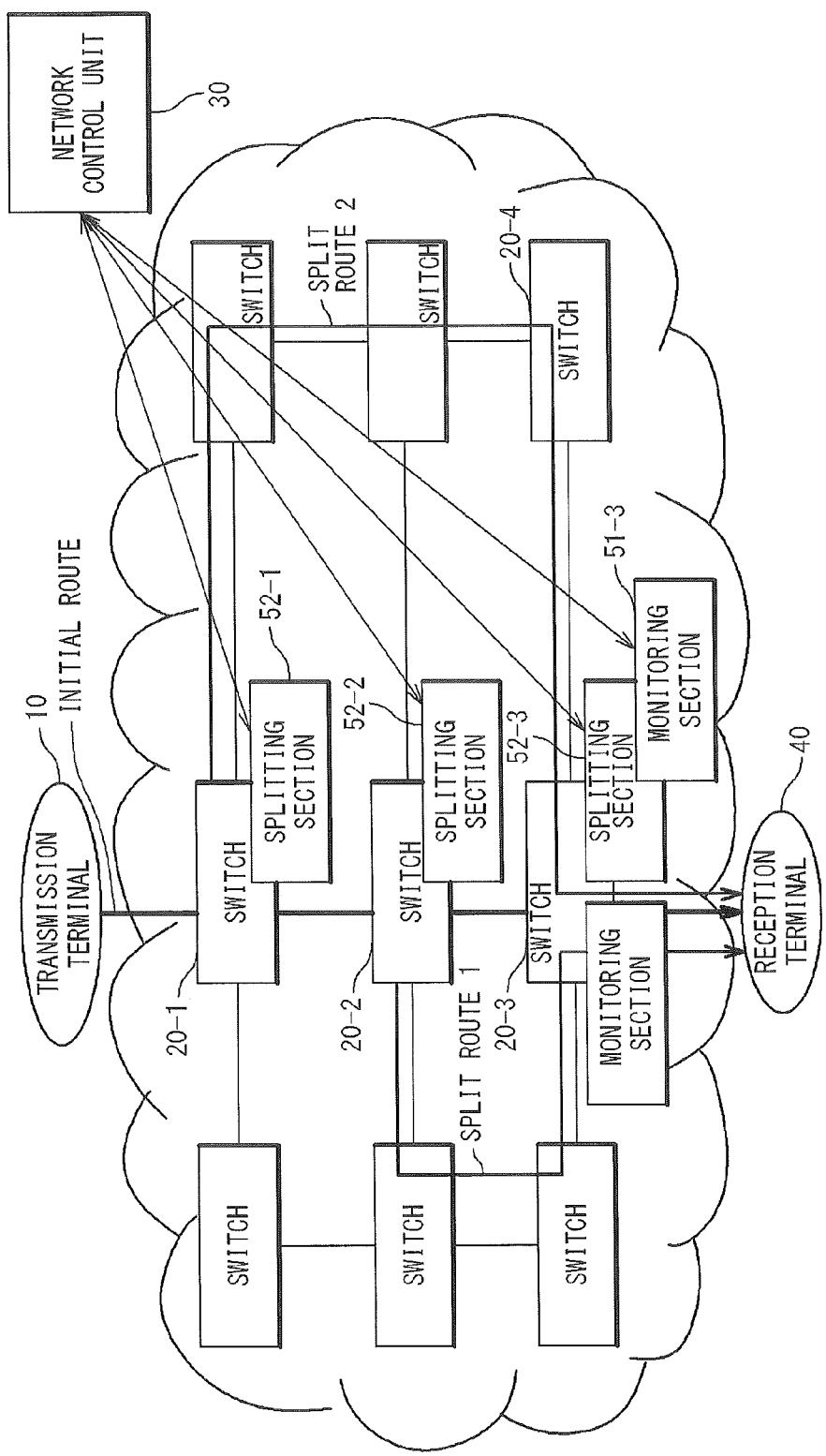
FIG. 2 is a diagram showing a first exemplary embodiment of the present invention.

In the present exemplary embodiment, as shown in FIG. 2, a case in which a monitoring process is executed only in the switch (Egress switch) 20 at the last stage which is the nearest to the reception terminal 40, of the switches 20 (20-$i$, i=1 to n) in the network will be described. In the present exemplary embodiment, the monitoring section 51 and the merging section 53 are provided in the switch (Egress switch) 20 at the last stage, and the splitting section 52 is provided in optional switches 20. That is, the monitoring section 51 and the merging section 53 function only in the switch (Egress switch) 20 at the last stage, and the splitting section 52 functions in all the switches of the network.

In an example of FIG. 2, the monitoring section 51 monitors the network quality of the traffic which is transmitted on an initial route from the transmission terminal 10 to the reception terminal 40, in the switch (Egress switch) 20 at the last stage which is the nearest to the reception terminal 40. The splitting section 52 splits a traffic flow in a relay switch. The merging section 53 merges split traffic flows to restore an appropriate traffic flow and then transmits it to the reception terminal 40. The network control unit 30 grasps topology data of the whole network, the band width data of the network link and so on, and carries out the optimum design of a split position and a split route.

Regarding a specific operation, the monitoring section 51 monitors the traffic flow which is transmitted on the initial route from the transmission terminal 10 to the reception terminal 40 at the switch (Egress switch) 20 at the last stage in response to an instruction from the network control unit 30. The monitoring section 51 notifies a situation analysis of the network and an alarm (warning) to the network control unit 30 when a network loss, a delay deviation, and degradation of the throughput are monitored in this traffic flow.

The network control unit 30 dynamically grasps the topology data of the network, the band width data of the network link and a change of the band width data, and determines each of a flow splitting method, a coding method, a split position, a split route according to the above alarm.

(Splitting Method)

Regarding the splitting method, the network control unit 30 can select different methods such as an identical copy (full mirroring), a partial copy (partial mirroring), a flow based division and a random division. At this time, the network control unit 30 determines which of the identical copy, the partial copy, the flow base division and the random division should be selected as the splitting method in the entire traffic flow or every traffic flow, and sets the selected splitting method to the splitting section 52. It should be noted that the network control unit 30 may set the splitting method to the splitting section 52 in response to an inquiry from the splitting section 52 which received the packet. Also, when the splitting section 52 refers to the data of the splitting method stored in the network control unit 30 voluntarily (periodically/according to a condition) and performs the processing, the same is essentially similar.

Figure 3:
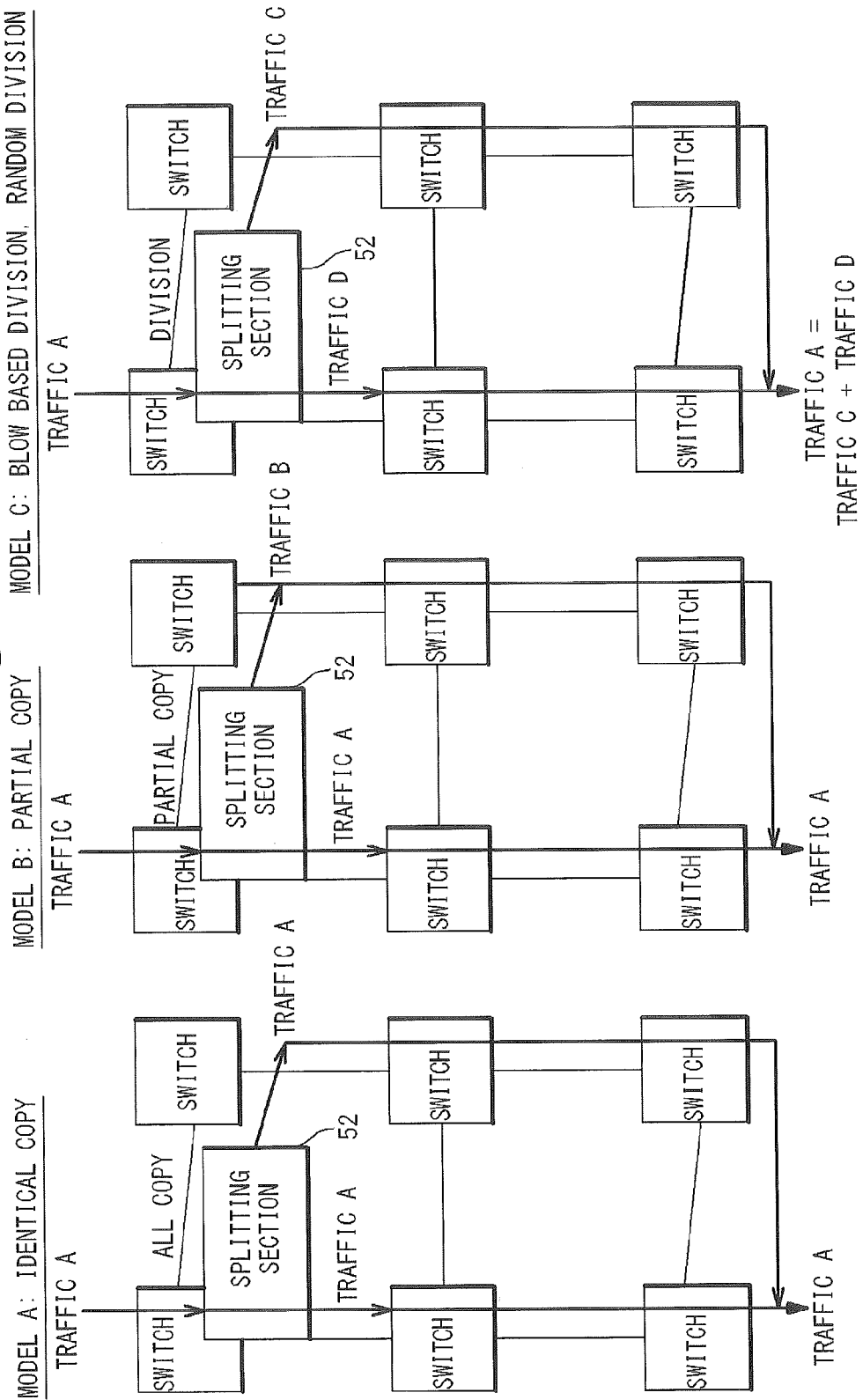
FIG. 3 is a diagram showing a splitting method.

(Description of Cases) "The identical copy (model A)", "the partial copy (model B)", "the flow base division and the random division (model C)" are shown in FIG. 3 as examples of the splitting method.

(Case 1)

First, a case of "the identical copy (model A)/the partial copy (model B)" will be described.

For example, when the load is high as the whole network and a loss in the network occurs in any route, or when the network is unstable so as to require a long time for restoration in case of a fault occurrence in the network, the network control unit 30 instructs the splitting section 52 to execute the identical copy (model A) or the partial copy (model B).

(Identical Copy)

In case of the identical copy, the splitting section 52 copies the entire traffic flow unconditionally and transmits them by a plurality of routes such as the initial route and a detour route (a split route). In the switch (egress switch) 20 at the last stage on the side of the reception terminal 40, the merging section 53 discards an overlapping portion from the traffic flows transmitted through the plurality of routes such as the initial route and the detour route to restore the right traffic flow, and transmits the right traffic flow to the reception terminal 40. Or, the merging section 53 transmits only the right traffic flow having reached through either of the plurality of routes such as the initial route and the detour route, to the reception terminal 40. In this case, even if a loss and an error occur in the traffic flow having reached through the initial route, the high-speed switching is possible for a network fault, because the right traffic flow can be restored based on the copied traffic flow having reached through any detour route.

(Partial Copy)

In case of the partial copy, the splitting section 52 carries out a mirroring partially to the received traffic flow, transmits the received traffic flow onto the initial route, and at the same time, transmits the copied traffic flow on the detour route. In this case, the splitting section 52 extracts a traffic flow with a high priority (a traffic flow with predetermined data showing the high priority, a traffic flow with a priority higher than a predetermined value) of the received traffic flows, and copies and transmits the copied traffic flow with the high priority onto the plurality of routes. Also, the splitting section 52 transmits the received traffic flow just as it is, on the initial route without carrying out the mirroring to the traffic flow with a priority which is not so high.

As an example of the traffic flow with the high priority, a traffic flow of data of a specific kind, a traffic flow showing a specific transmission source/transmission destination and so on are exemplified. However, the priority is only an example. Actually, it may be determined whether or not the partial copy is permitted based on a condition except the priority.

By carrying out the mirroring only to the traffic flow with the high priority, the increase of the traffic flow can be restrained, compared with a case where the identical copy is carried out to all the traffic flows. In the switch (Egress switch) 20 at the last stage on the side of the reception terminal 40, the merging section 53 restores the right traffic flow by discarding an overlapping portion from each of the traffic flows with the high priority having reached through the plurality of routes such as the initial route and the detour route and transmits the restored right traffic to the reception terminal 40. Or, the merging section 53 transmits only the right traffic flow from the traffic flows with the high priority having reached through either of the plurality of routes such as the initial route and the detour route to the reception terminal 40. Also, the merging section 53 transmits the traffic flows having reached through the routes to the reception terminal 40 just as it is, if the traffic flows have priorities which are not so high. In this case, even if a loss and an error occur in only the traffic flows with the high priority having reached on the initial route, the high-speed switching becomes possible to the network fault, because the right traffic flow can be restored based on the copied traffic flow having reached through any detour route.

(Case 2)

Next, a case of "flow base division/random division (model C)" will be described.

For example, when few bands exist on the whole network in a traffic system in which the loss in the whole network does not cause a problem, the network control unit 30 instructs the splitting section 52 to execute the flow base division (model C) or the random division (model C).

(Flow Base Division)

In case of the flow base division, the splitting section 52 changes the route every flow group based on flow data. In the switch (Egress switch) 20 at the last stage on the side of the reception terminal 40, the merging section 53 receives all the flow groups and transmits to the reception terminal 40.

(Random Division)

In case of the random division, the splitting section 52 changes the route randomly every packet. For example, the splitting section 52 alternately/randomly distributes the received packets to two split routes and transmits them. The same thing is applied in case of two or more split routes.

In the switch (Egress switch) 20 at the last stage on the side of the reception terminal 40, the merging section 53 receives all the packets and transmits them to the reception terminal 40. However, in case of the random division, it is necessary that a buffer is provided for the switch (Egress switch) 20 itself at the last stage on the side of the reception terminal 40 or the merging section 53 to accumulate the received packets, the merging section 53 in the switch (Egress switch) 20 at the last stage on the side of the reception terminal 40 transmits the packets after the reassembling of the packets (packet reordering).

(Combination of Splitting Methods (Composite))

It should be noted that "the identical copy (model A)", "the partial copy (model B)", "the flow base division and the random division (model C)" can be combined and executed. For example, when adopting "the identical copy (model A)/the partial copy (model B)", it is thought of to further adopt "the flow base division and the random division (model C)" to the copied traffic flow. Oppositely, when adopting "the flow base division and the random division (model C)", it can be thought of to further adopt "the identical copy (model A)/the partial copy (model B)" to the divided traffic. However, actually, it is not limited to these examples.

(Coding Method)

There are the following two coding methods.

One is a method in which any special processing is not carried out as usual packet processing. In this case, especially, the coding is not carried out. That is, the network control unit 30 sets nothing to the splitting section 52. The splitting section 52 transmits all the traffic flows just as they are.

The other is a method in which the transmission terminal 10 or either of the network switches 20 (20-*i*, i=1 to n) carries out special processing in which the coding is performed to the usual traffic flows every policy and relayed into the network. In this case, the transmission terminal 10 or either of the switches 20 (20-*i*, i=1 to n) in the network carries out the coding to add a priority, by using a method which is strong to the packet loss (which has packet loss tolerance) in an optional route such as hierarchization coding and multi-rate coding. The splitting section 52 transmits the traffic flows by taking the split redundancy of the mirroring to the traffic flow with a high priority and by passing through only a specific route to the traffic flow with a priority which is not so high.

For example, it is supposed that the transmission terminal 10 or either of the switches 20 (20-*i*, i=1 to n) in the network carries out the data coding by both of the hierarchization coding and multi-rate coding, and the data are divided into four data A, B, C, and D in order of higher priority. At this time, the splitting section 52 transmits data with high priorities (e.g. data A and B) to the route on the side on which the situation of the network is stable, at the split position (the relay switch 20) of the traffic flow. In the switch (Egress switch) 20 at the last stage on the side of the reception terminal 40, the merging section 53 carries out the redundant reception control and merges the traffic flows.

(Branch Position)

Regarding the split position, for example, in FIG. 2, the network control unit 30 calculates and determines a route with the least performance loss of the detour routes which split from any of the splitting sections 52 (52-1, 52-2, 52-3) and reaches the switch (Egress switch) 20 at the last stage.

For example, it is supposed that the route from the splitting section 52 (52-1) to the switch (Egress switch) 20 at the last stage is "4 Hop" (the number of Hops=4), the route from the splitting section 52 (52-2) to the switch (Egress switch) 20 at the last stage is "3 Hop" (the number of Hops=3), and the same performance can be provided. As an evaluation reference, the network control unit 30 compares the numbers of Hops and adopts a split route 1 from the splitting section 52 (52-2), because an influence to the network can be minimized when the distance of the detour route is shorter as much as possible.

On the other hand, when all the routes are in a condition that it is easy for the packet loss to occur due to congestion or in the condition that the network is unstable so that a probability of a fault is high, the network control unit 30 adopts both of the split route 1 from the splitting section 52 (52-2) and the split route 2 from the splitting section 52 (52-1). The splitting section 52 transmits the traffic flow onto the adopted split route as well as the initial route. In the switch (Egress switch) 20 at the last stage on the side of the reception terminal 40, the merging section 53 merges the traffic flows having reached through three routes of the initial route, the split route 1, and the split route 2 to guarantee the performance. In this determining method, the network control unit 30 may use other evaluation references such as minimization of a total of resource use amounts (the Hop number×band width, the distance×band width) over all of the initial route, the split route 1, and the split route 2 or maximization and stabilization of the quality of the reception terminal 40.

(Branch Route)

Regarding the split route, the network control unit 30 calculates which switch the detour route from the splitting section 52 (52-1, 52-2) passes through. The network control unit 30 grasps and sets a band width, a delay, a distance of the detour route on the network in this processing.

As described above, when determining a split position, a splitting method, and a split route, the network control unit 30 issues an instruction to the switch 20 corresponding to the split position, to instruct the splitting method to be adopted to the splitting sections 52 (52-1, 52-2) and so on, and sets the split route 1, the split route 2 and so on which detour from the splitting section 52. In this way, the setting of the branch to the switch 20 and the splitting sections 52 is centralized on the network control unit 30.

As this setting method, it is possible to use a transmission destination address (destination IP address) based static routing method, an MPLS based path routing method, a flow switching method using the Openflow technique and so on.

(Openflow Technique)

It should be noted that the Openflow (open flow) technique means a technique in which a controller (the network control unit 30 in this example) sets a multi-layer configuration and a route data in units of flows (flow table) to a switch based on flow definition data (flow: rule+action) set to itself as a routing policy, and carries out a routing control and a node control. In the open flow technique, the controller monitors the switches in the network and dynamically sets a delivery route of a packet to the switches in the network according to the situation of the network. Thus, the routing control function is separated from the switches and the optimal routing and traffic control become possible through the centralized control by the controller. The switch to which the open flow technique is applied deals with communication not in units of packets or frames like the conventional switch but as a flow of end to end (End to End).

The flow in the open flow technique is defined with any of a destination address, a source address, a destination port number, and a source port number contained in a header field of a TCP/IP (Transmission Control Protocol/Internet Protocol) packet, or various combinations of them and is distinguishable. It should be noted that it is supposed that the above-mentioned address contains a MAC address (Media Access Control Address) and an IP address (Internet Protocol Address). Also, it is supposed that the above-mentioned port contains a logical port and a physical port.

In case of a flow switching method which uses the open flow technique, for example, it is possible to set an explicit route every optional traffic flow group which is recognized in an optional header field in the layers of layer 1 to layer 4.

The details of the open flow technique have been described in Non-Patent Literatures 1 and 2.

(Merge Processing on the Side of Reception Terminal)

Figure 4:
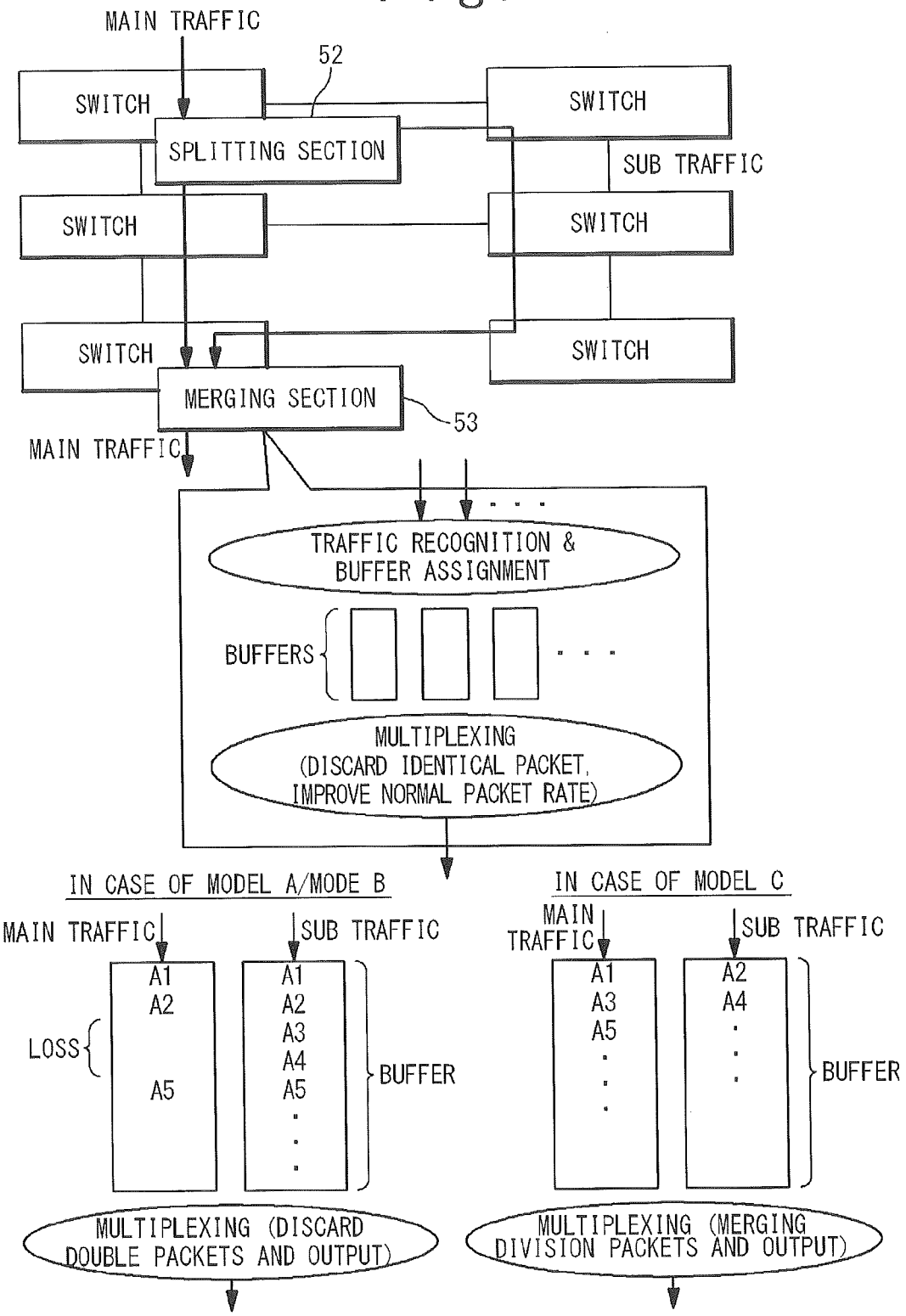
FIG. 4 is a diagram showing a merging method.

As shown in FIG. 4, in the switch (Egress switch) 20 at the last stage on the side of the reception terminal 40, the merging section 53 receives the traffic flows which are centralized from a plurality of split routes such as the split route 1, the split route 2, and so on except the initial route through the above-mentioned split processing, and selectively transmits to the reception terminal 40. The merging section 53 carries out selective adoption/discard processing in case of the identical copy, the partial copy, the flow base division processing, and so on, and carries out the reassembly (packet re-ordering) processing of packets in case of the random division, and realizes the merge processing.

(Monitor Processing on the Side of Reception Terminal)

In the switch (Egress switch) 20 at the last stage on the side of the reception terminal 40, the monitoring section 51 monitors the traffic flows before and after the merge processing by the merging section 53 and notifies the monitoring result to the network control unit 30.

(Others: Branch Processing 1 of Traffic Flows of Monitoring Result)

It should be noted that when the monitoring section 51 notifies the monitoring result to the network control unit 30, the splitting section 52 may split the traffic flow of the monitoring result to the network control unit 30. At this time, the network control unit 30 is equivalent to the reception terminal 40. The network control unit 30 sets a route from the switch 20 (the monitoring section 51) to the network control unit 30, to the splitting section 52 based on the previous monitoring result. For example, the monitoring section 51 transmits the traffic flow of the monitoring result to the splitting section 52 after the monitoring. The splitting section 52 splits the traffic flow of the monitoring result in the switch and the relay switch according to the plurality of split routes set by the network control unit 30. The merging section 53 merges the split traffic flows by the switch which is the nearest to the network control unit 30 to restore the appropriate traffic and then transmits the merged flow to the network control unit 30. That is, the monitoring result can be transmitted by use of a link of the plurality of different switches 20—the network control unit 30.

Second Exemplary Embodiment

Figure 5:
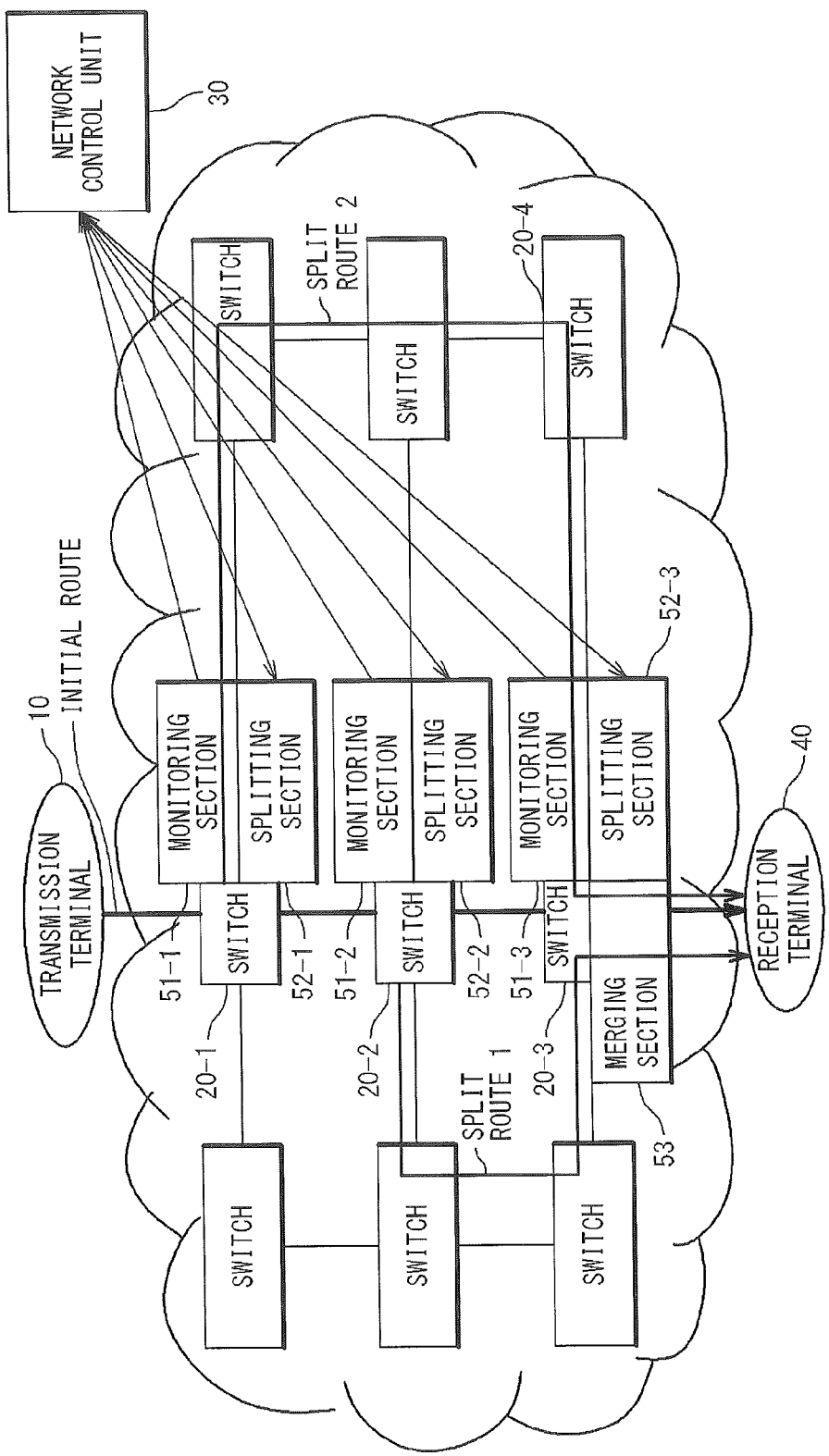
FIG. 5 is a diagram showing a second exemplary embodiment of the present invention.

Next, the second exemplary embodiment of the present invention will be described. In the present exemplary embodiment, as shown in FIG. 5, a case which monitoring processing is carried out by all the switches 20 in the network will be described. In the present exemplary embodiment, the merging section 53 exists in the switch (Egress switch) 20 at the last stage and the monitoring section 51 and the splitting section 52 exist in optional switches 20. That is, the merging section 53 functions only in the switch (Egress switch) 20 at the last stage, and the monitoring section 51 and the splitting section 52 function in all the switches in the network.

In an example of FIG. 5, the monitoring sections 51 (51-1, 51-2, 51-3) monitor the network quality of the traffic flow flowing on the initial route from the transmission terminal 10 to the reception terminal 40 in the relay switches 20 in addition to the switch (Egress switch) 20 at the last stage which is the nearest the reception terminal 40. The splitting sections 52 (52-1, 52-2, 52-3) split the traffic flow in the relay switch. The merging section 53 merges the split traffic flows in the switch (Egress switch) 20 at the last stage to restore an appropriate traffic flow and transmits it to the reception terminal 40. The network control unit 30 grasps the topology data of the entire network, the band width data of the network link and so on, and carries out an optimum design to a split position and a split route.

As described above, the difference from FIG. 2 is in that the conditions such as the packet loss in a link between the switches or congestion occurrence can be managed, because there are the monitoring sections 51 (51-1, 51-2, 51-3) in the relay switches 20. Therefore, for example, the route which detours at the switch at the first stage is desirable when detecting much loss by the monitoring section 51 (51-2), and the network control unit 30 adopts the split route 2 as the route for the detour by the splitting section 52 (52-1). Or, if the performance or function is deteriorated in the monitoring section 51 (51-3), the network control unit 30 can determine that the route is desirable to detour one of the splitting section 52 (52-1) and the splitting section 52 (52-2) or both of them, because it is possible to recognize that the packet is lost on the link between the second stage to third stage or the congestion has occurred. As the result of determination, the network control unit 30 can determine a splitting method of a flow, a coding method, a split position, and a split route by the same method as in FIG. 2.

(Others: Split Processing 2 of Traffic Flows of Monitoring Result)

It should be noted that when the monitoring is carried out in all the switches in the network like the present exemplary embodiment, the splitting section 52 may split the traffic flow of the monitoring result to the network control unit 30 in each switch in case that the monitoring section 51 notifies the monitoring result to the network control unit 30. At this time, the network control unit 30 is equivalent to the reception terminal 40. A route from the switch 20 (monitoring section 51) to the network control unit 30 is set to the splitting section 52 based on a preliminary monitoring result by the network control unit 30. For example, the monitoring section 51 transmits the traffic flow of the monitoring result to the splitting section 52 after the monitoring. The splitting section 52 splits the traffic flow of the monitoring result based on the plurality of split routes which are set by the network control unit 30 in the switch and the relay switch. The merging section 53 merges the split traffic flows in the switch which is the nearest to the network control unit 30 and transmits the merged flow to the network control unit 30 after restoring the appropriate traffic flow. That is, the monitoring result in each switch can be transmitted by use of a link of the plurality of different switches 20—the network control unit 30.

Third Exemplary Embodiment

Figure 6:
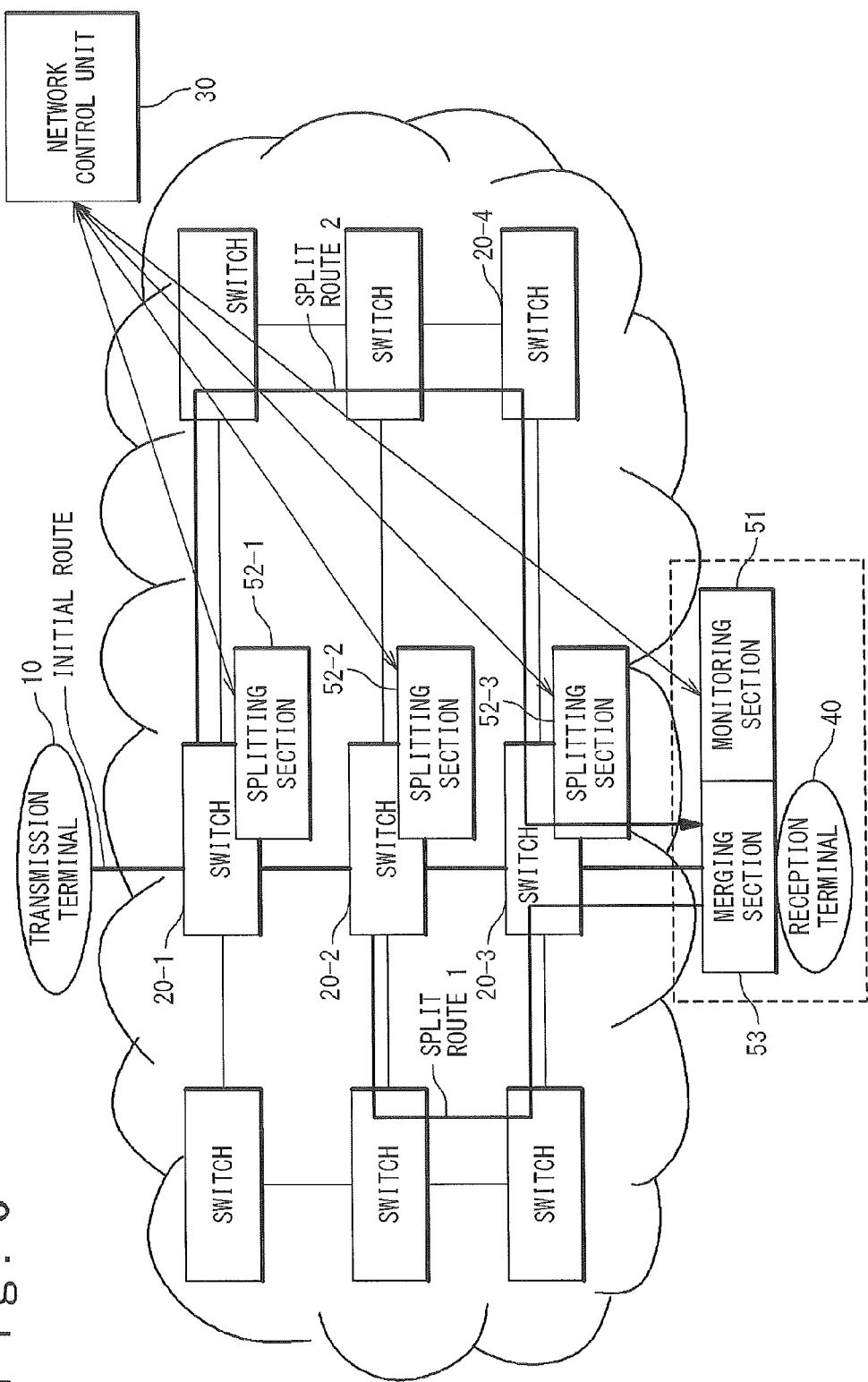
FIG. 6 is a diagram showing a third exemplary embodiment of the present invention.

Next, the third exemplary embodiment of the present invention will be described. In the present exemplary embodiment, a case that the monitoring and the merging are carried out in the reception terminal 40 as shown in FIG. 6 will be described. In the present exemplary embodiment, the monitoring section 51 and the merging section 53 exist in the reception terminal 40 and the splitting section 52 exists in optional switches 20. That is, the monitoring section 51 and the merging section 53 function only in the reception terminal 40 and the splitting section 52 functions in all the switches in the network.

In the present exemplary embodiment, it is supposed that the reception terminal 40 in addition to the switches 20 (20-$i$, $i$=1 to n) is provided with the dynamic route branching unit 50.

The dynamic route branching unit 50 is provided with the monitoring section 51, the splitting section 52, and the merging section 53. Therefore, the reception terminal 40 is provided with the monitoring section 51, the splitting section 52, and the merging section 53, like each of the switches 20 (20-$i$, $i$=1 to n). However, it is not necessary that the reception terminal 40 is provided with all of the monitoring section 51, the splitting section 52 and the merging section 53. It is sufficient that the reception terminal 40 is provided with at least one to be used of the monitoring section 51, the splitting section 52 and the merging section 53.

In an example of FIG. 6, the monitoring section 51A in the reception terminal 40 monitors the network quality of the traffic flow flowing on the initial route from the transmission terminal 10 to the reception terminal 40. The splitting sections 52 (52-1, 52-2, 52-3) split traffic flows in the switch (Egress switch) 20 at the last stage in the network and the relay switch. The merging section 53 merges the split traffic flows and restores an appropriate traffic to transmit it to the reception terminal 40. The network control unit 30 grasps the topology data of the whole network, the band width data of the network link and so on and carries out the optimum design of a split position and a split route.

Compared with FIG. 2, the monitoring section 51 and the merging section 53 are only moved from the switch (Egress switch) 20 at the last stage to the reception terminal 40. The same processing as originally executed in the switch (Egress switch) 20 at the last stage is executed in the reception terminal 40. The other processing is same as in FIG. 2.

Also, in FIG. 2, because a case that the reception terminal 40 is connected only with a single switch (the switch at the last stage) 20 of the network is shown, all the traffic flows on the split route 1, the split route 2, and the initial route which are split in the splitting sections 52 (52-1, 52-2) are multiplexed and transmitted onto a single link of the switch 20 at the last stage—the reception terminal 40.

(Others: Merging of the Traffic Flows of the Monitoring Result in the Network Control Unit 30)

It should be noted that if the present exemplary embodiment is applied, it is possible to carry out merge processing in not the switch which is the nearest to the network control unit 30 but the network control unit 30 when the splitting sections 52 split the traffic flow of the monitoring result to the network control unit 30 in case that the monitoring section 51 notifies the monitoring result to the network control unit 30. In this case, it is supposed that the network control unit 30 is provided with the dynamic route branching unit 50. Here, it is not necessary that the network control unit 30 is provided with all of the monitoring section 51, the splitting section 52 and the merging section 53, and it is sufficient that the network control unit 30 is provided with the merging section 53 at least.

Fourth Exemplary Embodiment

Figure 7:
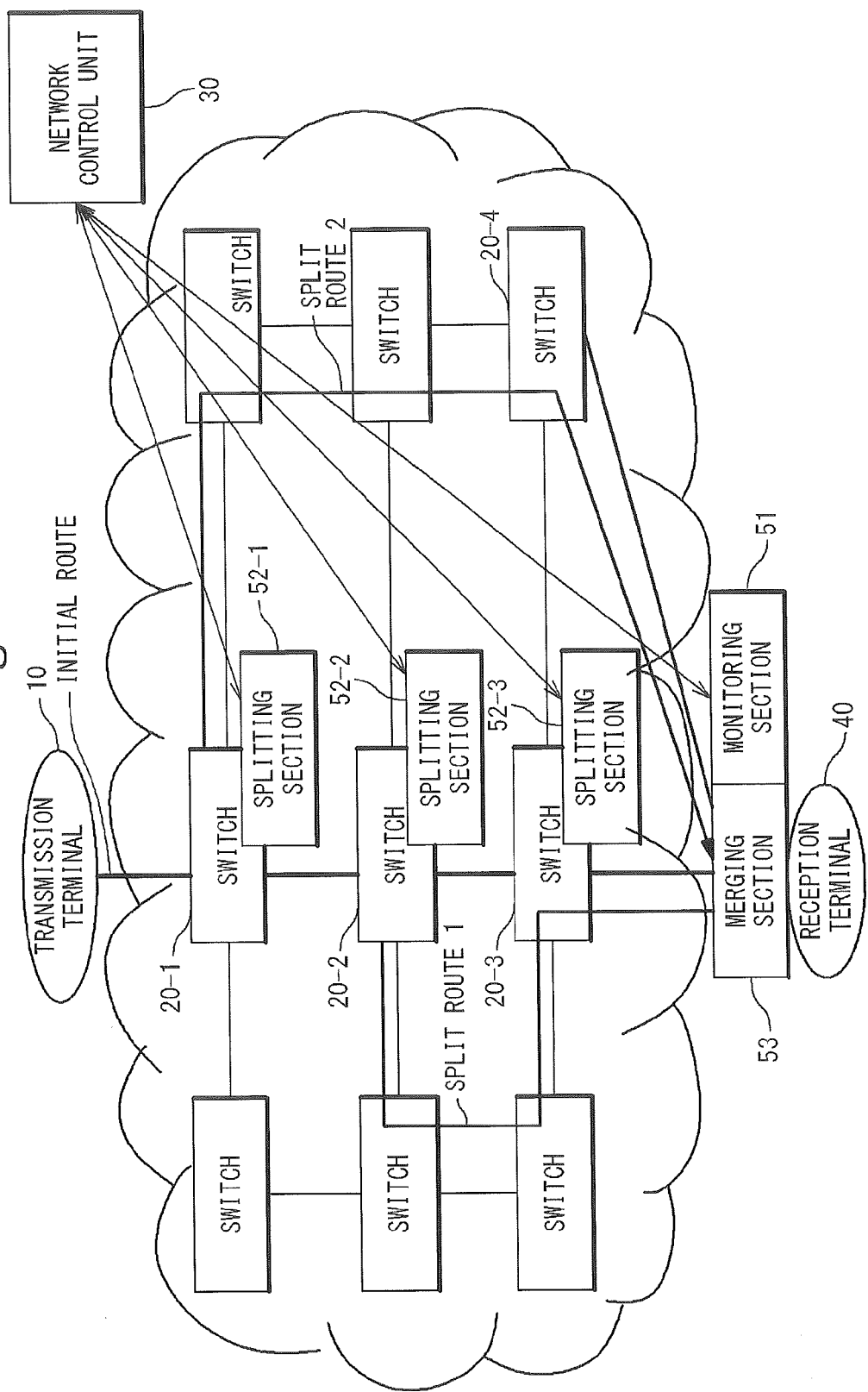
FIG. 7 is a diagram showing a fourth exemplary embodiment of the present invention.

Next, the fourth exemplary embodiment of the present invention will be described. In the present exemplary embodiment, as shown in FIG. 7, a case in which the merging and monitoring are carried out in the reception terminal 40 in the condition that the reception terminal 40 is connected directly with the two or more switches 20 will be described. Moreover, in the present exemplary embodiment, the reception terminal 40 is connected with the two or more switches 20 at the last stage of the network in the third exemplary embodiment of the present invention shown in FIG. 6.

In the present exemplary embodiment, like the third exemplary embodiment, it is supposed that the reception terminal 40 in addition to the switches 20 (20-$i$, $i$=1 to n) is provided with the dynamic route branching unit 50.

Moreover, in the present exemplary embodiment, it is supposed that the reception terminal 40 is provided with a plurality of communication interfaces (communication ports) to communicate directly with the plurality of switches 20 (20-$i$, $i$=1 to n). The merging section 53 merges the traffic flows received through the plurality of different communication interfaces in the reception terminal 40.

In an example of FIG. 7, the reception terminal 40 and the two switches 20 (20-3, 20-4) are connected, but actually, the reception terminal 40 may be connected with three or more switches 20.

In the present exemplary embodiment, each of the traffic flows of the split route 1, the split route 2, and the initial route split by the splitting sections 52 (52-1, 52-2) can be transmitted by use of the links of the plurality of different switches 20 which—the reception terminal 40. The network control unit 30 determines a link to be used, in consideration of the performance of the detour route.

Fifth Exemplary Embodiment

Next, the fifth exemplary embodiment of the present invention will be described. In the present exemplary embodiment, a case which a wire network and a wireless network are mixed will be described with reference to FIG. 8. In the present exemplary embodiment, the reception terminal 40 is connected with the wireless network in addition to the wire network in the fourth exemplary embodiment of the present invention shown in FIG. 7.

Figure 8:
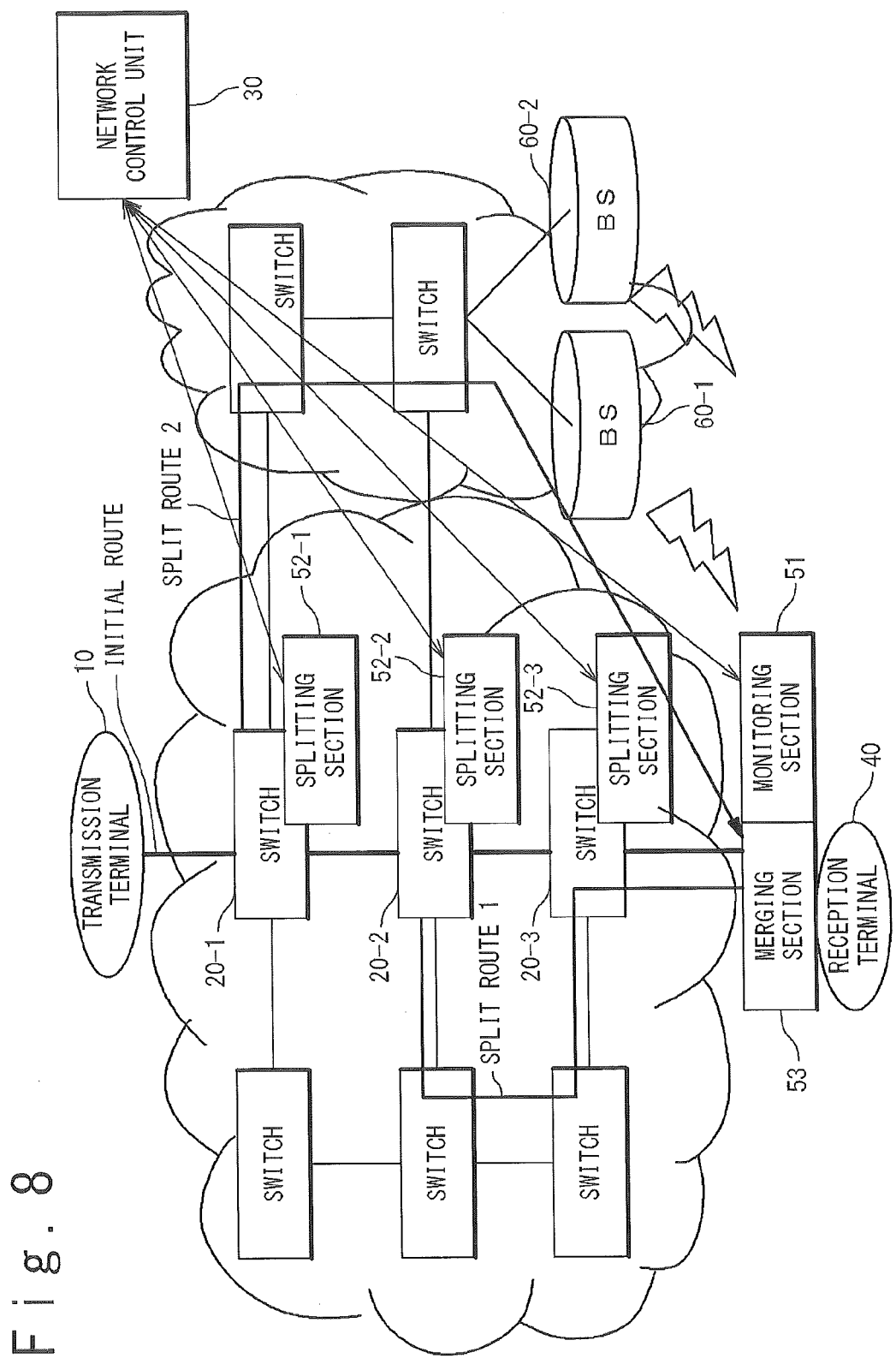
FIG. 8 is a diagram showing a fifth exemplary embodiment of the present invention.

In an example of FIG. 8, the reception terminal 40 is connected with the wire network through one or more switches and is connected with the wireless network through one base station (BS).

Moreover, the dynamic route branching system of the present invention contains base stations 60 (60-$k$, $k$=1 to m: m is the number of base stations) in the present exemplary embodiment. That is, in the present exemplary embodiment, the dynamic route branching system according to the present invention contains the transmission terminal 10, the switches 20 (20-$i$, $i$=1 to n), the network control unit 30, the reception terminal 40 and the base stations 60 (60-$k$, $k$=1 to m).

Also, in the present exemplary embodiment, it is supposed that the reception terminal 40 in addition to the switches 20 (20-$i$, $i$=1 to n) is provided with the dynamic route branching unit 50, like the third and fourth exemplary embodiments.

The base station 60 (60-$k$, $k$=1 to m) communicates directly with the reception terminal 40 as the relay unit at the last stage of the wireless network. At this time, it is supposed that the reception terminal 40 is provided with the wire communication interfaces to communicate with the switches 20 (20-$i$, $i$=1 to n) and the wireless communications interfaces to communicate with the base station 60 (60-$k$, $k$=1 to m).

For example, the traffic flow on the route split by the splitting section 52 (52-1) passes through a backbone network of the wireless network and detours through one optional base station 60 (60-1). The traffic flow on the route split by the splitting section 52 (52-2) passes through the wire network. The merging section 53 of the reception terminal 40 receives and merges the traffic flows on all the detour routes.

At this time, the merging section 53 merges the traffic flows received through a plurality of different communication interfaces of the wire communication interface and the wireless communication interface, in the reception terminal 40. The network control unit 30 determines which of the detour routes and which of links of the wireless network and the wire network should be used, in consideration of the performance of the detour routes.

Sixth Exemplary Embodiment

Figure 9:
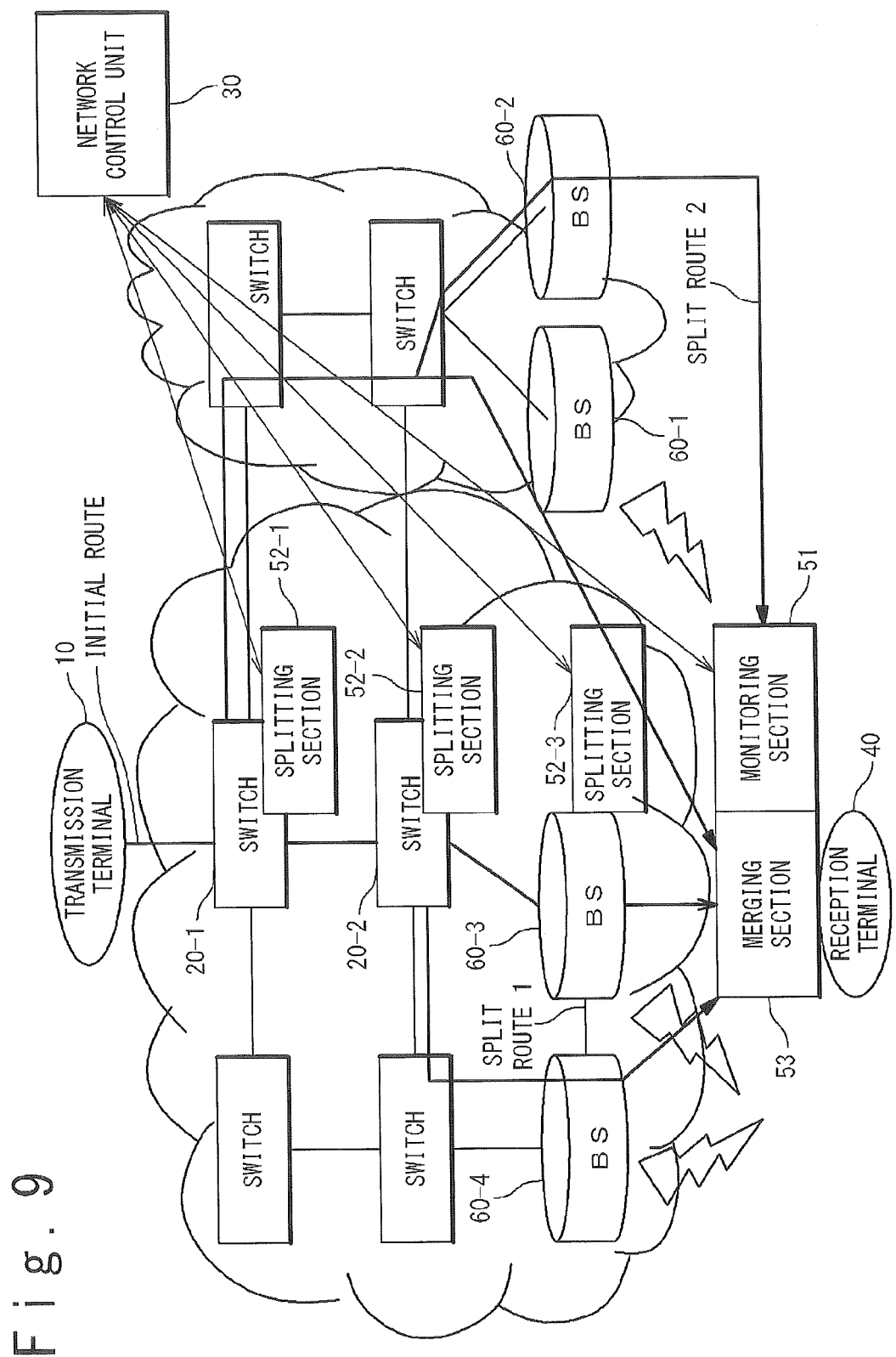
FIG. 9 is a diagram showing a sixth exemplary embodiment of the present invention.

Next, the sixth exemplary embodiment of the present invention will be described. In the present exemplary embodiment, as shown in FIG. 9, a case where the wire network and the wireless network are mixed, and the merging and the monitoring are carried out in the reception terminal 40 in the condition that the reception terminal 40 can communicate directly with the tow or more base stations 60 will be described. Moreover, in the present exemplary embodiment, the reception terminal 40 is connected with the wireless network through two or more base stations in the fifth exemplary embodiment of the present invention shown in FIG. 8.

The basic configuration of the dynamic route branching system of the present exemplary embodiment is same as that of the fifth exemplary embodiment of the present invention shown in FIG. 8.

Moreover, in the present exemplary embodiment, it is supposed that the reception terminal 40 is provided with the plurality of wireless communication interfaces to communicate with plurality of base stations 60 (60-$k$, k=1 to m). In the same way, the reception terminal 40 may be provided a plurality of wire communication interfaces to communicate directly with plurality of the switches 20 (20-$i$, i=1 to n). The merging section 53 merges the traffic flows received through the plurality of different communication interfaces in the reception terminal 40.

In an example of FIG. 9, the reception terminal 40 can receive the traffic flows from two or more base stations 60 (60-1, 60-2, 60-3, 60-4) in the plurality of wireless networks at the same time. Which of detour routes and links on the wire network and the wireless network are used is determined by the network control unit 30 in consideration of the performance of the detour route, like the fifth exemplary embodiment of the present invention.

Seventh Exemplary Embodiment

Figure 10:
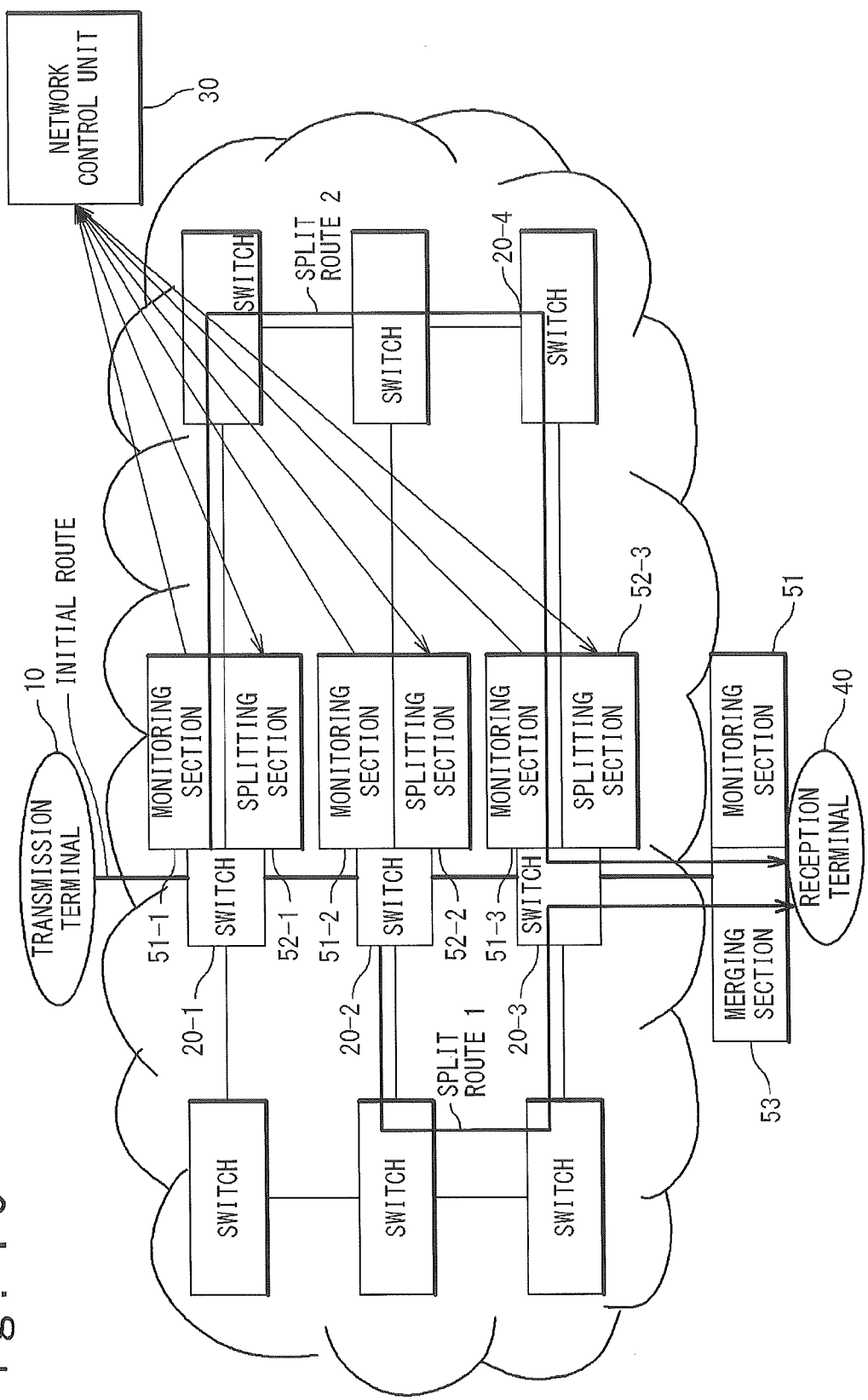
FIG. 10 is a diagram showing a seventh exemplary embodiment of the present invention.

Next, the seventh exemplary embodiment of the present invention will be described. In the present exemplary embodiment, as shown in FIG. 10, a case in which the merging and the monitoring are carried out in all the switches 20 in the network and the reception terminal 40 will be described. Moreover, in the present exemplary embodiment, a case in which the monitoring section 51 is further provided in the relay switch 20 in the third exemplary embodiment of the present invention shown in FIG. 6 will be described.

In an example of FIG. 10, the monitoring sections 51 (51-1, 51-2, 51-3) are provided to monitor the network quality in the relay switch 20, compared with an example of FIG. 6. The network control unit 30 can manage that a packet is lost in a link between which switches and congestion has occurred, by the monitoring sections 51 (51-1, 51-2, 51-3) on the relay switch 20. The split position can be selected clearer based on these conditions.

Eighth Exemplary Embodiment

Next, the eighth exemplary embodiment of the present invention will be described. In the present exemplary embodiment, a case in which the present invention is applied to a multicast path will be described as shown in FIG. 11.

In the other exemplary embodiments, a case in which the traffic flow of from the transmission terminal 10 to the reception terminal 40 is unicast communication is exemplified. In an example of FIG. 11, it is assumed that the traffic flow from the transmission terminal 10 to the reception terminal 40 is the multicast communication.

In case of the multicast communication, the traffic flow is appropriately split in the switch on the way from the transmission terminal 10 to the reception terminal 40 and is transmitted to a destination. However, when the packet loss occurs only in, for example, a specific relay link or congestion has occurred, it is not possible to apply a multipath routing control only to the link.

Figure 11:
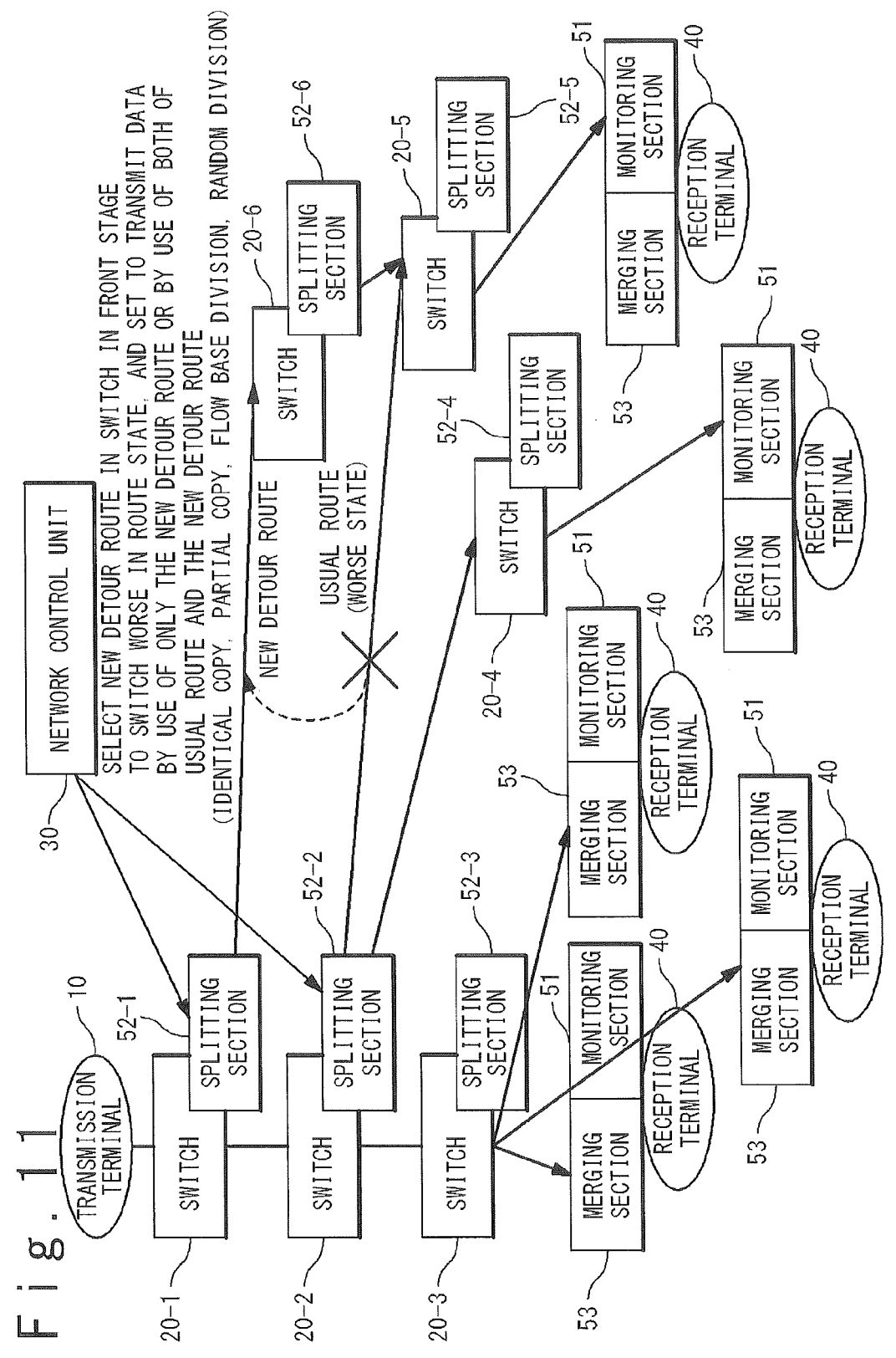

In an example of FIG. 11, when recognizing the function deterioration path in the initial route, the network control unit 30 sets to the splitting section 52, the splitting of the traffic flow from an optional switch in front of the path or the splitting of the traffic flow from any switch in the path, in order to improve the performance of the path. Here, the use of the function deterioration path continues and the traffic flow is transmitted at both of the function deterioration path and the detour route.

At this time, if providing the monitoring section 51 for all the switches 20 in the network to the monitor by all the switches 20 in the network, it could be considered that the function deterioration path can be specified more correctly.
(Determination Processing of Optional Switch in Front Stage to the Function Deterioration Path]

As a method of determining an optional switch in the front stage to the function deterioration path, a repetitive selecting method could be thought of in which the network control unit 30 simply selects a switch previous to the function deterioration path, and another switch in further front is selected when the performance of the path is not improved even if the split route from the switch is used. Or, a selecting method could be thought of in which the network control unit 30 calculates an optimal split route from the transmission terminal 10 to the reception terminal in the present situation based on the monitoring result and the topology data of the whole network, and a switch is selected to realize the optimal split route. However, actually, the present invention is not limited to these examples.

In an example of FIG. 11, the function deterioration path is only one, but actually, there sometimes are a few function deterioration paths. In such a case, the network control unit 30 sets appropriate execution of the split processing to the splitting section 52 so as to improve the performance of each path.

By selecting and receiving the traffic flow split by the merging section 53 on the side of the reception terminal 40 corresponding to the multicast communication, the traffic reception performance can be improved.

Ninth Exemplary Embodiment

Next, the ninth exemplary embodiment of the present invention will be described. In the present exemplary embodiment, as shown in FIG. 12, a case in which a final reception destination is dynamically changed through the splitting of the route will be described.

In the other exemplary embodiments, a case in which all of the split traffic flows are transmitted to the switch (Egress switch) 20 at the last stage or the reception terminal 40 has been described. On the other hand, in the present exemplary embodiment, the traffic flow is split or branched in an optional switch (Egress switch) 20 and is transmitted to another unit in addition to the reception terminal 40. Here, it is supposed that another unit is a network monitoring unit 70 which analyzes a network situation in detail by analyzing the traffic flow itself. It should be noted that the other unit may be another reception terminal 40.

In an example of FIG. 12, the dynamic route branching system of the present invention further contains the network monitoring unit 70. That is, the dynamic route branching system of the present invention contains the transmission terminal 10, the switches 20 (20-i, i=1 to n), the network control unit 30, the reception terminal 40 and the network monitoring unit 70 in the present exemplary embodiment.

The network control unit 30 sets a split route for the side of the reception terminal 40 and a split route for the side of the network monitoring unit 70, to the splitting section 52 on optional switch 20. It should be noted that the split route for the side of the reception terminal 40 may be the initial route. At this time, the network control unit 30 sets the split route for the side of the network monitoring unit 70 to the splitting section 52 in the switch 20 which forms the split route for the side of the network monitoring unit 70.

In the relay switch 20, the splitting section 52 splits or branches the received traffic flow according to the route set by the network control unit 30, and transmits the traffic flow identical to the traffic flow which is transmitted for the side of the reception terminal 40, to the network monitoring unit 70.

Also, in the switch (Egress switch) 20 at the last stage, the merging section 53 merges the split traffic flows to restore an appropriate traffic flow and transmits this traffic flow to the splitting section 52 on the same the switch. The splitting section 52 splits this traffic flow according to the route set by the network control unit 30 and transmits the traffic flow identical to the traffic flow which is transmitted for the side of the reception terminal 40, to the network monitoring unit 70.

In this case, the splitting section 52 transmits the traffic flow identical to the traffic flow which is transmitted for the side of the reception terminal 40 through the identical copy, to the side of the network monitoring unit 70. However, actually, a splitting method except the identical copy may be adopted. For example, the splitting section 52 may carry out the partial copy of only a traffic flow with a high priority, of the traffic flows which are transmitted for the side of the reception terminal 40 and may transmit the partially copied traffic flow on the split route to the side of the network monitoring unit 70. Or, the splitting section 52 may carry out a flow base division to the traffic flow which is transmitted for the side of the reception terminal 40, and copy only the predetermined flow to transmit it on the split route to the side of the network monitoring unit 70.

The network monitoring unit 70 receives the traffic flow identical to the traffic flow which is transmitted to the side of the reception terminal 40, and analyzes this traffic flow to generate the monitoring result which is more detailed than that by the monitoring section 51. That is, the network monitoring unit 70 can analyze in detail, the traffic flow itself which the optional switch 20 receives. The network control unit 30 acquires the detailed monitoring result from the network monitoring unit 70. It should be noted that the network control unit 30 and the network monitoring unit 70 may be an identical unit.

In an example of FIG. 12, the splitting section 52 splits the traffic flow on the initial route flowing through the relay switch and the switch (Egress switch) 20 at the last stage or the traffic flow flowing through the split route to the network monitoring unit 70 as the traffic flow to be transmitted to the network monitoring unit 70. The network monitoring unit 70 analyzes the split traffic flow. Or, the merging section 53 merges the traffic flows split in the switch (Egress switch) 20 at the last stage, and then the splitting section 52 splits the restored traffic flow in the restored condition (the condition that the quality at the reception terminal 40 can be confirmed) to the network monitoring unit 70 in the switch (Egress switch) 20 at the last stage or the reception terminal 40. The network monitoring unit 70 analyzes the split traffic. Through the analysis, if the quality of the flow which the reception terminal 40 will receive is insufficient, an instruction is transmitted to the side of the network control unit 30 and optimization is attempted by changing the algorithm.

Tenth Exemplary Embodiment

Next, the tenth exemplary embodiment of the present invention will be described. In the present exemplary embodiment, a case in which the number of split routes is two or more in the optional switch in the network will be described. In the present exemplary embodiment, the splitting section 52 splits the traffic flow to the two or more split routes in the optional switch in the network.

In the other exemplary embodiments, an example of the splitting into two is shown in which a split route is generated from the initial route in the splitting section 52. However, actually, the splitting into N (N: N is equal to or more than 2) is possible. Also, it is possible that the splitting section 52 splits into N routes, each of the detour routes such as the split route 1 and the split route 2, in addition to the initial route.

<Relation of Exemplary Embodiments>

It should be noted that the above-mentioned exemplary embodiments can be carried out by combining them. For example, the network control unit 30 may set individually to carry out the split processing corresponding to each exemplary embodiment to each of the switches 20 (20-i, i=1 to n) which are present on the plurality of different networks.

SUMMARY

As mentioned above, in the present invention, a function can be provided not to give a network a wasteful load by dynamically carrying out the optimum design such that the cost spent to the network is minimized through adoption of a multipath route.

In the dynamic route branching system of the present invention, by monitoring the reception quality of the communication traffic on the network, a split position of the traffic flow, a splitting method such as a copy and a division, and split routes calculated to attempt optimization based on the maximization and stabilization of the reception quality, and the traffic flow is dynamically split onto a plurality of routes by the splitting method such as copy and division in one or more optional node positions (at least one position) of the nodes through which the communication traffic flow passes, and the traffic flow is restored in the receiving end.

In the dynamic route branching system of the present invention, the traffic flow quality is monitored in real time, and by a mirroring function (the identical copy function) which carries out the mirroring of all of the traffic flows from an optional upstream position, the whole traffic flow is restored quickly by using the traffic flow in the sub-route, even if the phenomenon that the traffic flow is discarded in the main route occurs due to a state change in the network, and it is possible to improve the traffic reception performance of the reception terminal.

Also, in the dynamic route branching system of the present invention, the traffic flow quality is monitored in real time, and by a mirroring function (the partial copy function) which carries out the mirroring of only the partial traffic flow (traffic flow with a high priority) from an optional upstream position, the traffic flow with the high priority is restored quickly by using the traffic flow in the sub-route, even if the phenomenon that the traffic flow with the high priority is discarded in the main route occurs, and it is possible to improve the traffic reception performance of the reception terminal.

Also, in the dynamic route branching system of the present invention, the traffic flow quality is monitored in real time, and because there is a flow base branch function or a random branch function (a flow base division function, and a random division function) from an optional upstream position, a whole band width is increased by distributing to a plurality of routes, even if the phenomenon of congestion of a network link occurs, and it is possible to improve the traffic reception performance of the reception terminal.

Also, in the dynamic route branching system of the present invention, because the traffic flow quality in the reception terminal is monitored in real time, and there is a splitting function of the traffic flow from an optional upstream position, it is possible to improve the traffic reception performance of the reception terminal, even if the phenomenon of congestion of a wireless network and a wire network occurs.

Also, in the dynamic route branching system of the present invention, because there is a function of monitoring the traffic flow quality in the reception terminal of multicast correspondence in real time, and splitting the traffic flow from an optional upstream position in a tree on an optional route in the multicast path, it is possible to dynamically improve the traffic performance of only the route and improve the degraded traffic reception performance of the reception terminal of the multicast correspondence, even if the route of a part of the multicast path is congested so that a phenomenon that the reception performance of the reception terminal of the multicast correspondence is degraded occurs.

Also, in the dynamic route branching system of the present invention, because there is a function of dynamically specifying a destination of the split traffic flow to a destination except the reception terminal, e.g. an address of the network monitoring unit, it is possible to optimize an algorithm setting of the network control unit and to improve the reception performance of the reception terminal, by dynamically performing status monitoring in a necessary part in addition to the improvement of the traffic performance of the reception terminal through the mirroring operation of a redundant route.

ADDITION

As described above, the exemplary embodiments of the present invention have been described in detail. However, actually, the present invention is not limited to the above-mentioned exemplary embodiments and contains various modifications in a range which does not apart from the scope of the present invention.

The invention claimed is:

1. A system including a plurality of nodes to forward a data packet in a network, the system comprising:
a controller to select at least a node dividing a data path of the data packet into a first path and a second path, from the nodes, based on a condition of the data path;
a node selected by the controller being capable of forwarding the packet to the first path and the second path according to an instruction from the controller,
wherein the second path comprises a bypass path of the first path, and
wherein the controller selects said at least said node that splits the data path based on a reception quality of a traffic flow on said network; and
a dynamic route splitter configured to be arranged in said at least said node to relay the traffic flow on said network or a reception terminal as a destination of the traffic flow, wherein said dynamic route splitter is arranged in the plurality of said nodes in said network.

2. The system according to claim 1, wherein the node forwards a subset of packets through the first path to the first path and the second path.

3. The system according to claim 1, further comprising:
a merging unit to merge packets through the first path and the second path.

4. The system according to claim 1, further comprising:
a monitoring unit to monitor the condition of the data path and to notify the condition to the controller.

5. The system according to claim 1, further comprising:
a monitoring section configured in each of the plurality of said nodes to monitor the traffic flow having reached to each of said nodes, and to notify a monitoring result to said controller.

6. The system according to claim 1, wherein the condition of the data path comprises the reception quality of the traffic flow on said network.

7. A node to forward a data packet in a network, the node comprising:
a first unit to receive an instruction from a controller which selects at least the node dividing a data path of the data packet into a first path and a second path, from a plurality of nodes, based on a condition of the data path; and
a second unit being capable of forwarding the packet to the first path and the second path according to the instruction,
wherein the second path comprises a bypass path of the first path,
wherein the controller selects said at least said node that splits the data path based on a reception quality of a traffic flow on said network,
wherein a dynamic route splitter is configured to be arranged in said at least said node to relay the traffic flow on said network or a reception terminal as a destination of the traffic flow, and
wherein said dynamic route splitter is arranged in the plurality of said nodes in said network.

8. The node according to claim 7, wherein the second unit forwards a subset of packets through the first path to the first path and the second path.

9. The node according to claim 7, further comprising:
a merging unit to merge packets through the first path and the second path.

10. The node according to claim 7, further comprising:
a monitoring unit to monitor the condition of the data path and to notify the condition to the controller.

11. A controller to control a node forwarding a packet in a network, the controller comprising:
a first unit to select at least a node dividing a data path of the data packet into a first path and a second path, from a plurality of nodes, based on a condition of the data path; and
a second unit to instruct dividing the data path to the node which is capable of forwarding the packet to a first path and a second path,
wherein the second path comprises a bypass path of the first path, wherein the controller selects said at least said node that splits the data path based on a reception quality of a traffic flow on said network, wherein a dynamic route splitter is configured to be arranged in said at least said node to relay the traffic flow on said network or a reception terminal as a destination of the traffic flow, and wherein said dynamic route splitter is arranged in the plurality of said nodes in said network.

12. The controller according to claim 11, further comprising:
a third unit to instruct merging packets through the first path and the second path to a node including a merging unit to merge packets.

13. The controller according to claim 11, wherein the first unit receives the condition of the data path from a node including a monitoring unit to monitor the condition.

14. A method to forward a packet, the method comprising:
receiving an instruction from a controller which selects at least the node dividing a data path of the data packet into a first path and a second path, from a plurality of nodes, based on a condition of the data path; and forwarding the packet to the first path and the second path according to the instruction, wherein the second path comprises a bypass path of the first path, wherein the controller selects said at least said node that splits the data path based on a reception quality of a traffic flow on said network, wherein a dynamic route splitter is configured to be arranged in said at least said node to relay the traffic flow on said network or a reception terminal as a destination of the traffic flow, and wherein said dynamic route splitter is arranged in the plurality of said nodes in said network.

15. The method according to claim 14, further comprising:
forwarding a subset of packets through the first path to the first path and the second path.

16. The method according to claim 14, further comprising:
merging packets through the first path and the second path.

17. The method according to claim 14, further comprising:
monitoring the condition of the data path and notifying the condition to the controller.

* * * * *